United States Patent
Mattox, Jr. et al.

(10) Patent No.: US 9,542,564 B2
(45) Date of Patent: *Jan. 10, 2017

(54) PERSONAL SITE PRIVACY POLICY

(71) Applicant: Microsoft Technology Licensing, LLC, Redmond, WA (US)

(72) Inventors: Gregory Thomas Mattox, Jr., Bellevue, WA (US); Venkatesh Veeraraghavan, Seattle, WA (US); Bryant Fong, Kirkland, WA (US); Shunri Guo, Sammamish, WA (US); James C. Hilke, Redmond, WA (US); Rachel A. Elfenbein, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/171,443

(22) Filed: Feb. 3, 2014

(65) Prior Publication Data

US 2014/0245462 A1  Aug. 28, 2014

Related U.S. Application Data

(63) Continuation of application No. 11/565,432, filed on Nov. 30, 2006, now Pat. No. 8,646,095.

(51) Int. Cl.
*H04L 29/06* (2006.01)
*G06F 21/62* (2013.01)

(52) U.S. Cl.
CPC ............ *G06F 21/62* (2013.01); *G06F 21/6218* (2013.01); *G06F 21/6245* (2013.01); *H04L 63/10* (2013.01); *H04L 63/101* (2013.01); *H04L 63/102* (2013.01); *H04L 63/105* (2013.01); *G06F 2221/2113* (2013.01); *G06F 2221/2141* (2013.01)

(58) Field of Classification Search
CPC .. H04L 63/10; G06F 21/62; G06F 2221/2113; G06F 2221/2141
USPC ............... 726/1–4, 21, 26–30; 713/182–186; 709/217–229
See application file for complete search history.

(56) References Cited

U.S. PATENT DOCUMENTS

| | | |
|---|---|---|
| 5,727,156 A | 3/1998 | Herr-Hoyman et al. |
| 6,529,956 B1 | 3/2003 | Smith et al. |
| 6,574,736 B1 | 6/2003 | Andrews |
| 6,804,674 B2 | 10/2004 | Hsiao et al. |
| 6,829,711 B1 | 12/2004 | Kwok et al. |
| 6,934,856 B1 | 8/2005 | Provitola |
| 7,062,532 B1 * | 6/2006 | Sweat et al. ................... 709/205 |
| 7,437,427 B1 * | 10/2008 | Veeraraghavan et al. ..... 709/217 |
| 8,407,353 B2 * | 3/2013 | Moses et al. .................. 709/229 |
| 8,646,095 B2 | 2/2014 | Mattox, Jr. et al. |
| 2002/0029296 A1 | 3/2002 | Anuff et al. |
| 2002/0116642 A1 | 8/2002 | Joshi et al. |

(Continued)

OTHER PUBLICATIONS

Information Revelation and Privacy in Online Social Networks by Gross et al; Publisher: ACM: Year: 2005.*

(Continued)

*Primary Examiner* — Madhuri Herzog
(74) *Attorney, Agent, or Firm* — Merchant & Gould P.C.

(57) ABSTRACT

A request, from a requester, is received to view user information on a user's personal site associated with a user. A relationship is determined between the requester and the user. User information is provided to the requester based on the requester's relationship to the user.

16 Claims, 13 Drawing Sheets

(56) References Cited

U.S. PATENT DOCUMENTS

| | | |
|---|---|---|
| 2004/0015408 A1 | 1/2004 | Rauen et al. |
| 2005/0246311 A1 | 11/2005 | Whelan et al. |
| 2006/0080432 A1 | 4/2006 | Spataro et al. |
| 2006/0161646 A1 | 7/2006 | Chene et al. |
| 2007/0271232 A1 | 11/2007 | Mattox et al. |
| 2007/0271330 A1 | 11/2007 | Mattox et al. |
| 2008/0046976 A1* | 2/2008 | Zuckerberg ................. 726/4 |
| 2008/0049767 A1* | 2/2008 | Koltenuk .................... 370/401 |

OTHER PUBLICATIONS

Information Revelation and Privacy in Online Social Networks to Gross et al; Publisher: ACM; Year: 2005.

Ljudevit Bauer "Access Control for the Web Via Proof-Carrying Authorization", A Dissertation Presented to the Faculty of Princeton University, Nov. 2003.

Microsoft Corporation "Microsoft Office SharePoint Server 2007", Evaluation Guide, Feb. 2006.

Open Text Corporation "White Paper. Livelink WCM Server: Content Server", Sep. 10, 2004.

Reddot Solutions Corporation "RedDot Web Content Management", Mar. 2006.

\* cited by examiner

| Profile Property | Show To |
|---|---|
| About me: | Everyone ~806 |
| Picture: | Everyone |
| Current Projects: | My Workgroup |
| Past Projects: | [Everyone ▼] ~808 |
| Skills: | [Everyone ▼] |
| Work Interests: | Everyone |
| Languages: | [My Colleagues ▼] |
| Recreation: | [Everyone ▼] |
| Birthday: | [My Manager ▼] |
| Organization chart: | Everyone |
| Schools: | [My Manager ▼] |

Edit Profile
Fred Jones   804

| Site Settings | | | |
|---|---|---|---|
| Manage Policy | 1204 | | |

| User information | Policy | Visibility | Override? |
|---|---|---|---|
| *Profile properties* | | | |
| Work Address | Mandatory | Everyone | No |
| Work Phone | Mandatory | Everyone | No |
| Home Address | Mandatory | My Manager | Yes |
| Home Phone | Mandatory | My Manager | Yes |
| Schools | Opt-In | My Colleagues | Yes |
| Skills | Opt-In | Everyone | Yes |
| Work Interests | Opt-In | Everyone | Yes |
| Languages | Opt-In | Everyone | Yes |
| | | | |
| *Colleagues* | | | |
| Email based recommendations | Opt-Out | Everyone | Yes |
| DL based recommendations | Mandatory | Everyone | Yes |
| IM based recommendations | Opt-Out | Everyone | Yes |
| | | | |
| *Memberships* | | | |
| Network Site recommendations | Opt-Out | Everyone | Yes |
| DL recommendations | Mandatory | Everyone | Yes |
| Collaborative recommendations | Opt-Out | Everyone | Yes |
| | | | |
| *Links* | | | |
| Links on personal site | Opt-in | Everyone | Yes |
| Upload favorites | Opt-in | Everyone | Yes |
| Links to documents on other sites | Opt-out | Everyone | Yes |

FIG. 12

PERSONAL SITE PRIVACY POLICY

CROSS-REFERENCE TO RELATED APPLICATIONS

This application is a continuation of application Ser. No. 11/565,432, filed Nov. 30, 2006, which application is incorporated herein by reference in its entirety.

BACKGROUND

Organizations, such as corporations and government agencies, maintain databases regarding employee information. Such organizations may provide personal web sites for employees that allow access to employee information by other employees. Such information may include an employee email address, work phone number, personal interests, and employee photograph.

In current systems, privacy settings of personal information on personal sites have limited flexibility. In some cases, information on personal sites may only be limited to two settings: public or private. Some privacy settings are limited to a default setting that cannot be changed by a system administrator. Other privacy settings cover broad categories of information and provide no ability to adjust privacy settings to specific data within a category.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Embodiments herein provide privacy settings for user information on personal sites. Examples of privacy settings include Only Me, My Manager, My Workgroup, My Colleagues, and Everyone. Embodiments herein allow control over user information on a per-item basis to provide a high level of granularity. Embodiments herein include a preview functionality to provide users a view of what information others are allowed to see on the user's personal site. Embodiments herein include management control over system wide privacy policy.

Many of the attendant features will be more readily appreciated as the same become better understood by reference to the following detailed description considered in connection with the accompanying drawings.

BRIEF DESCRIPTION OF THE DRAWINGS

Like reference numerals are used to designate like parts in the accompanying drawings.

FIG. 8 is a diagram of an edit profile page in accordance with an embodiment of the invention.

FIG. 12 is a diagram of a privacy policy management page in accordance with an embodiment of the invention.

DETAILED DESCRIPTION

The detailed description provided below in connection with the appended drawings is intended as a description of the present examples and is not intended to represent the only forms in which the present examples may be constructed or utilized. The description sets forth the functions of the examples and the sequence of steps for constructing and operating the examples. However, the same or equivalent functions and sequences may be accomplished by different examples.

Figure 1:
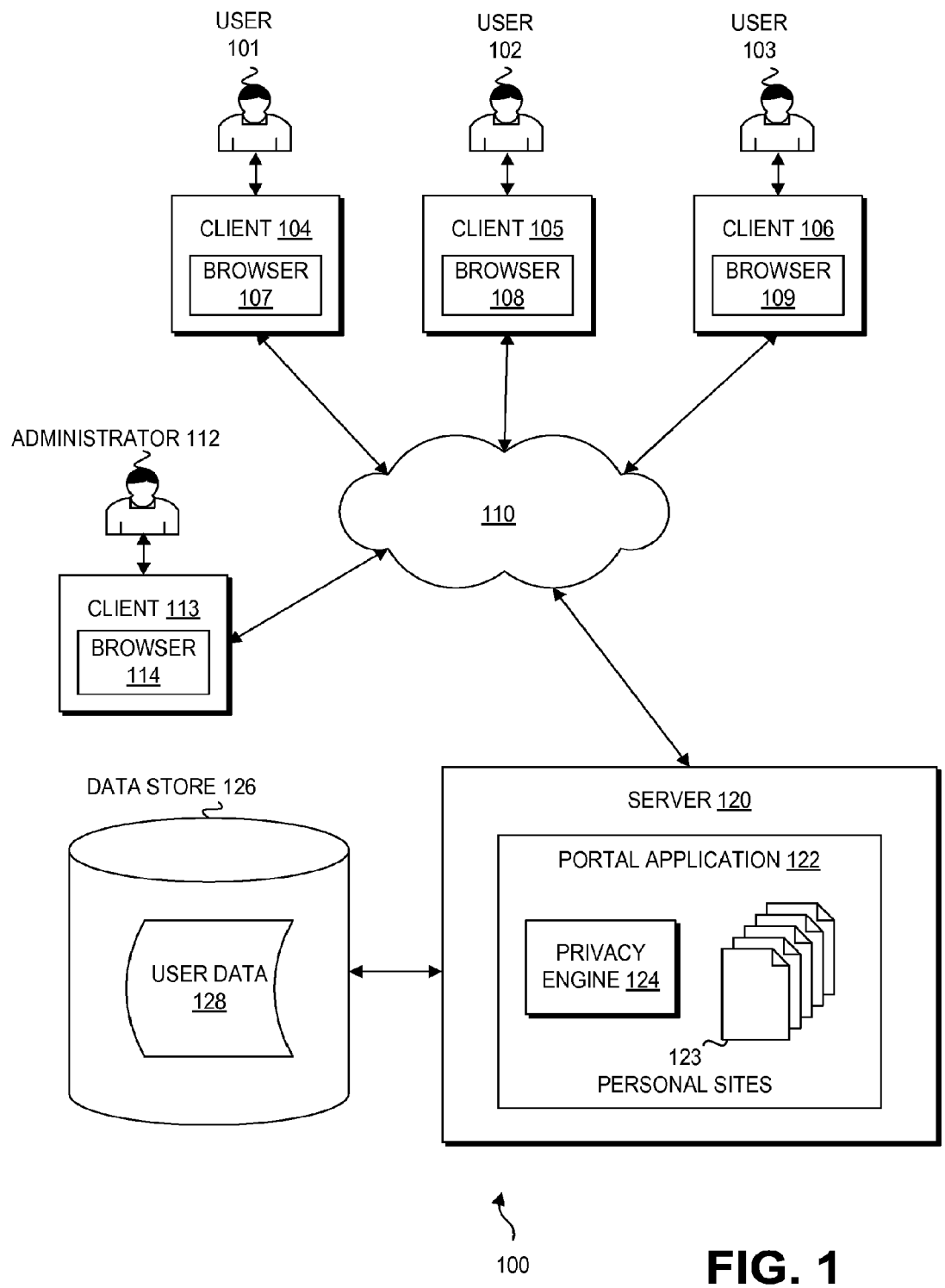
FIG. 1 is a block diagram of an example computing environment for implementing embodiments of the invention.

FIG. 1 and the following discussion are intended to provide a brief, general description of a suitable computing environment to implement embodiments of the invention. The operating environment of FIG. 1 is only one example of a suitable operating environment and is not intended to suggest any limitation as to the scope of use or functionality of the operating environment. Other well known computing systems, environments, and/or configurations that may be suitable for use with embodiments described herein may include, but are not limited to, personal computers, server computers, hand-held or laptop devices, mobile devices (such as mobile phones, Personal Digital Assistants (PDAs), media players, and the like), multiprocessor systems, consumer electronics, network personal computers, mini computers, mainframe computers, distributed computing environments that include any of the above systems or devices, and the like.

Although not required, embodiments of the invention will be described in the general context of "computer readable instructions" being executed by one or more computing devices. Computer readable instructions may be distributed via computer readable media (discussed below). Computer readable instructions may be implemented as program modules, such as functions, objects, application programming interfaces (APIs), data structures, and the like, that perform particular tasks or implement particular abstract data types. Typically, the functionality of the computer readable instructions may be combined or distributed as desired in various environments.

FIG. 1 shows an embodiment of a computing environment 100. Embodiments of computing environment 100 include an enterprise system for a corporation, government agency, university, or other similar entity. Embodiments of computing devices, such as clients (e.g., personal computers, mobile devices, etc.) and servers, and the like, that may be included in computing environment 100 are discussed below in conjunction with FIG. 13.

Computing environment 100 includes clients 104, 105, and 106 that may communicate with a server 120 using network 110. Client 104 may execute a browser 107 for use by a user 101. Client 105 may execute a browser 108 for use by a user 102. Client 106 may execute a browser 109 for use by a user 103. In one embodiment, a browser includes Microsoft Internet Explorer®.

In one embodiment, a user's personal site may be viewed by other users (also referred to as viewers) in an organization using a browser on a client. In general, a personal site includes one or more web pages that provide user information about a user (such as contact information). A personal site may also be referred to as a personal portal. Embodiments herein provide privacy settings that control what information on a user's personal site is displayed to a viewer at a client based on the viewer's relationship to the user.

Environment 100 also includes a client 113 to display a browser 114. Client 113 (as well as clients 104-106) may be used by a system administrator 112 to modify system privacy policy, change default privacy settings, and modify user data (discussed further below).

Server 120 includes a portal application 122 for supporting personal sites 123. In one embodiment, each member of an organization, such as employees of a corporation, has their own personal site. Portal application 122 includes a privacy engine 124 for administrating privacy settings to personal sites 123. In one embodiment, personal sites 123 are supported by a portal application that is part of a suite of applications in Microsoft's Office SharePoint® Server 2007. In SharePoint® Server 2007, personal sites 123 may be referred to as MySites. FIG. 1 shows a single server 120 for the sake of clarity, but one skilled in the art will appreciate that computing environment 100 may include multiple servers.

Server 120 may access a data store 126 than has stored user data 128. Data store 126 may be accessed directly by server 120 as shown in FIG. 1, or may be accessed via network 110, or via another network (not shown). While one data store 126 is shown for clarity, one skilled in the art will appreciate that computing environment 100 may include multiple data stores 126. In various embodiments, one or more data stores 126 may be co-located with server 120 or located off-site.

Figure 2:
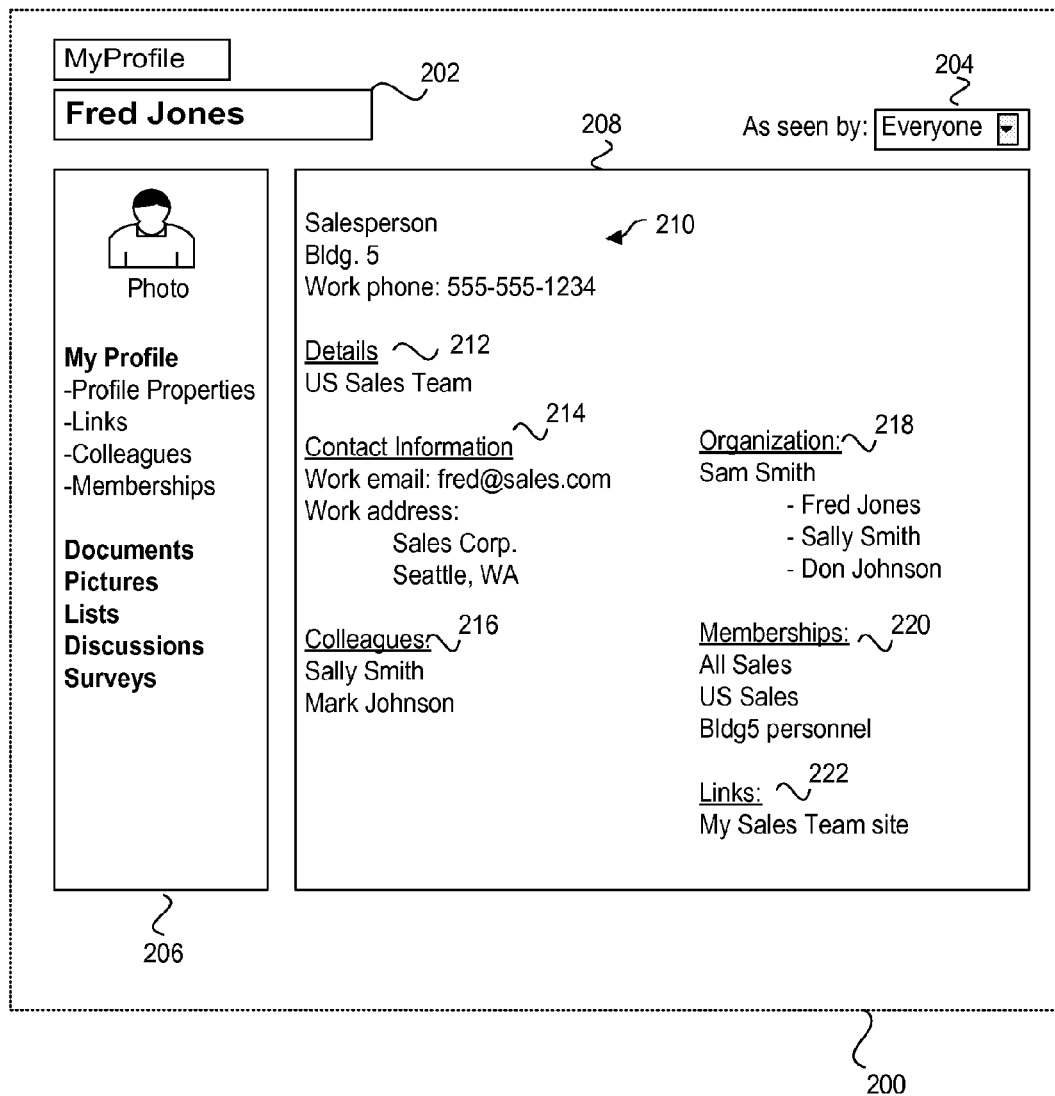
FIG. 2 is a diagram of a personal site in accordance with an embodiment of the invention.

Turning to FIG. 2, an embodiment of a personal site 200 is shown. Embodiments of the invention are not limited to the information content or arrangement of information in FIG. 2. While embodiments of the invention are described in a business organization context, it will be understood that embodiments herein are not limited to business environments. In one embodiment, information shown in personal site 200 may be provided from one or more data stores 126. These data stores 126 may be associated with a directory (for example, a Microsoft Active Directory, a Lightweight Directory Access Protocol (LDAP) compatible directory, etc.), business applications, customer built applications, and the like.

Personal site 200 is associated with a user named "Fred Jones", as shown at 202. Section 206 shows a photo of Fred Jones and links to various user information associated with Fred Jones. User information includes information associated with each user. User information may include profile properties, links, colleagues, and memberships. User information may also include content (for example, documents, pictures, video, etc.) that has been uploaded to the user's personal site.

Section 208 shows a summary of user information. A viewer may see more detailed user information by selecting a link in section 206 or a link in section 208. Area 210 of section 208 shows some profile properties such as job position ("salesperson"), office location ("bldg. 5"), and work phone. Section 208 may also include other profile properties such as details 212 (Fred Jones workgroup "US Sales Team"), contact information 214 (work email and work address), and an organization chart of the user, at 218. In FIG. 2, Fred Jones' direct supervisor is Sam Smith. Sam Smith also supervises Sally Smith and Don Johnson. In one embodiment, the viewer may see another page having more user profile properties by clicking the profile properties link in section 206.

Section 208 includes a summary of other user information for Fred Jones. This other user information includes colleagues (shown at 216), memberships (shown at 220), and links (shown at 222). In one embodiment, a viewer may select one of these and be sent to another page that has a complete list of the user's colleagues, memberships, and links. As described below, the privacy settings of items under colleagues, memberships, and links may be controlled on a per-item basis.

Personal site 200 may also include a preview tool 204. Preview tool 204 allows the user to preview what information will be seen by viewers in various privacy settings. In FIG. 2, the user may use a pull-down menu to select a preview for Everyone, My Colleagues, My Workgroup, and My Manager. FIG. 2 shows the preview of information as seen by Everyone. The embodiment of preview function 204 in FIG. 2 uses a pull-down menu, but one skilled in the art will appreciate alternative implementations. Embodiments of a preview functionality are discussed further below in connection with FIGS. 9 and 10.

Figure 3:
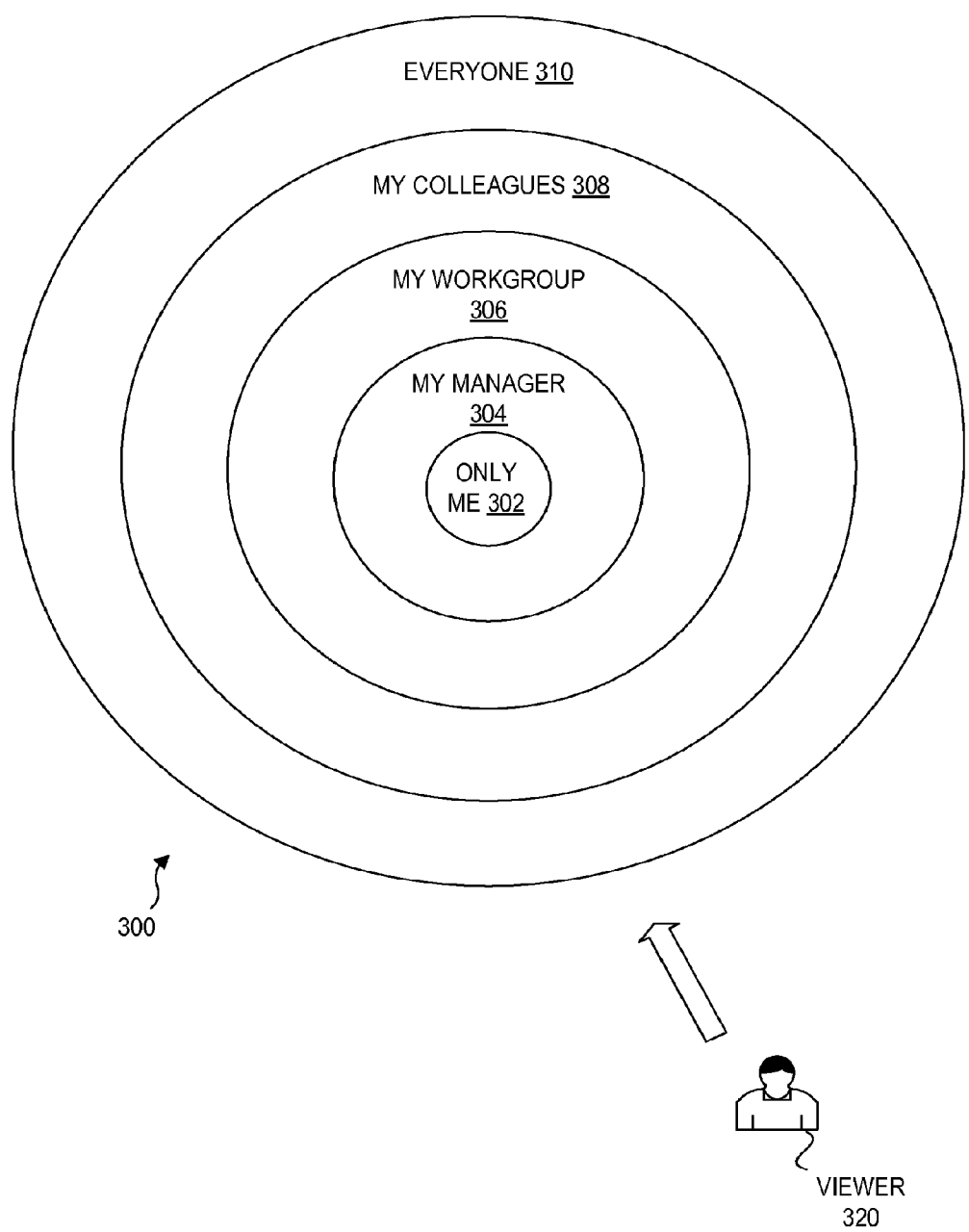
FIG. 3 is a block diagram of a privacy settings hierarchy in accordance with an embodiment of the invention.

Turning to FIG. 3, an embodiment of a privacy setting hierarchy 300 is shown. Hierarchy 300 shows the relationship of the privacy settings to each other. Hierarchy 300 is arranged in concentric circles to show that members of a privacy setting group include all the members of any group within that group. For example, My Colleagues 308 includes all persons of My Workgroup 306, My Manager 304 and Only Me 302.

A privacy setting of Only Me 302 limits viewing of information to only the user. An example of such information may include a pay-stub page or document. In some embodiments, at least a portion of Only Me information may be viewable and editable by people having special privileges, such as a system administrator or human resources personnel.

Privacy setting My Manager 304 allows information to be viewable by the user's manager. My Workgroup 306 allows information to be viewable by people in a user's workgroup. In one embodiment, a user's manager and a user's work group are defined by an organizational hierarchy and/or organization policy. In one embodiment, people who have a relationship of My Manager and My Workgroup may not be edited by the user.

In one embodiment, My Colleagues 308 may include one or more persons who have a direct relationship with the user. A colleague may include a friend, a co-worker, a business associate, or other person. A colleague may include a person that the user has met in person or has developed a relationship with through email, telephone, or the like.

In one embodiment, an application executing on server 120 may suggest potential colleagues to a user. The application may analyze which people are contacted in a user's email traffic, phone traffic, instant messaging traffic, or other communications, to build a list of suggested colleagues for the user. The user may edit the suggested colleague list as desired (for example, remove suggested colleagues or add people to the user's colleagues not on the suggested list). An embodiment of such an application is disclosed in U.S. patent application Ser. No. 11/438,423, titled "Relating People Finding Results by Social Distance", filed May 22, 2006.

In one embodiment, suggested colleagues are limited to people that are one degree from the user, that is, people that the user has had direct contact with. In another embodiment, suggested colleagues may include people that are more than one degree away from a user. For example, suggested colleagues may include people who have direct contact with a user (first degree of separation) as well as colleagues of these people (second degree of separation). These degrees of separation (also referred to as "social networking") may be extended as desired.

In one embodiment, Everyone 310 may include all persons associated with an organization, such as all employees of a corporation. In another embodiment, Everyone 310 may include all members of the public that may access the personal site using the Internet. In yet another embodiment, Everyone 310 is assigned to items that have no privacy protection.

When a viewer 320 wishes to view a user's personal site, embodiments of the invention determine what the relationship is of viewer 320 to the user. This relationship defines what privacy setting viewer 320 falls into and consequently what user information may be seen by viewer 320 on the user's personal site.

It will be appreciated that embodiments of the invention provide access to information based on relationships between people. This model may be distinguished from an access control list model. Usually, an access control list is tied to information itself, such as a document or database, and indicates what users may access the information. Embodiments herein operate using relationships between people.

As relationships change between people, then access to information may also change. For example, assume that a person's manager changes. With embodiments herein, a user does not have to make changes to privacy settings on their personal site. Once the new manager is designated as the person's manager (and the old manager undesignated), then the new manager may view My Manager information and the old manager no longer has access to My Manager information. The user does not have to change privacy settings on their personal site. Further, the burden of updating numerous access control lists due to a change in the user's manager has been eliminated.

Figure 4:
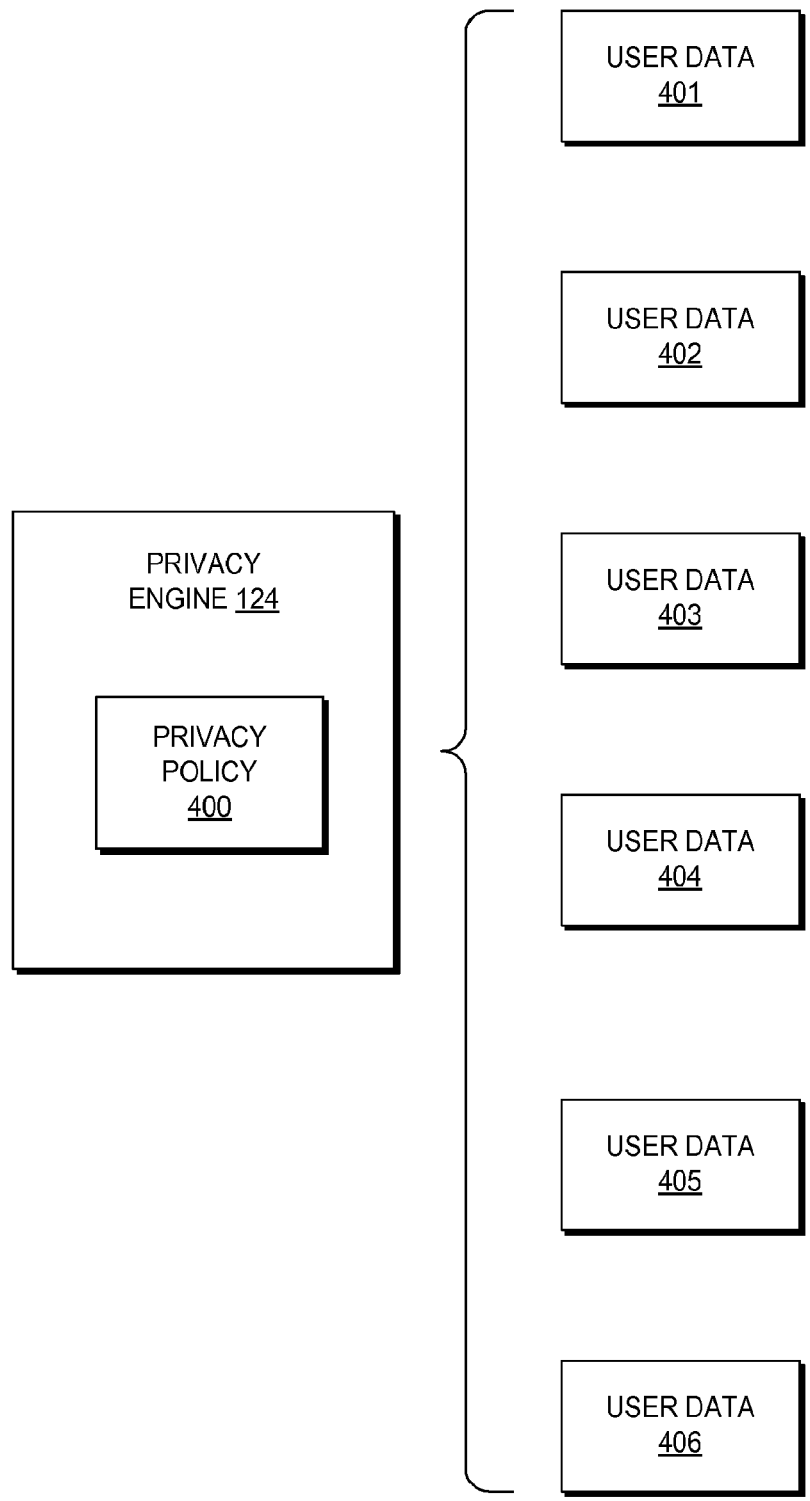
FIG. 4 is a block diagram of a privacy policy and user data in accordance with an embodiment of the invention.

Turning to FIG. 4, a block diagram of a privacy policy 400 and user data 401-406 in accordance with an embodiment of the invention is shown. In one embodiment, privacy engine 124 may apply privacy policy 400 to user data for determining what user information may be displayed to a viewer. FIG. 4 shows user data 401-406 where each user data is associated with a different user (i.e., six users). User data corresponds to the user information available on a user's personal site.

Privacy policy 400 may include privacy settings that are set according to an organization's policy and may not be changed by a user. For example, a user's work phone number is defaulted to Everyone and this privacy setting may not be modified by a user. Privacy policy 400 may also include privacy settings that are modifiable by a user. For example, a user's home address may be defaulted to a privacy setting of My Manager, but the user may be allowed to change this privacy setting. In determining the privacy settings to be applied to user information, both the organization's privacy policy and the user's modified privacy settings are used (described further below in conjunction with FIGS. 5 and 6).

Figure 5:
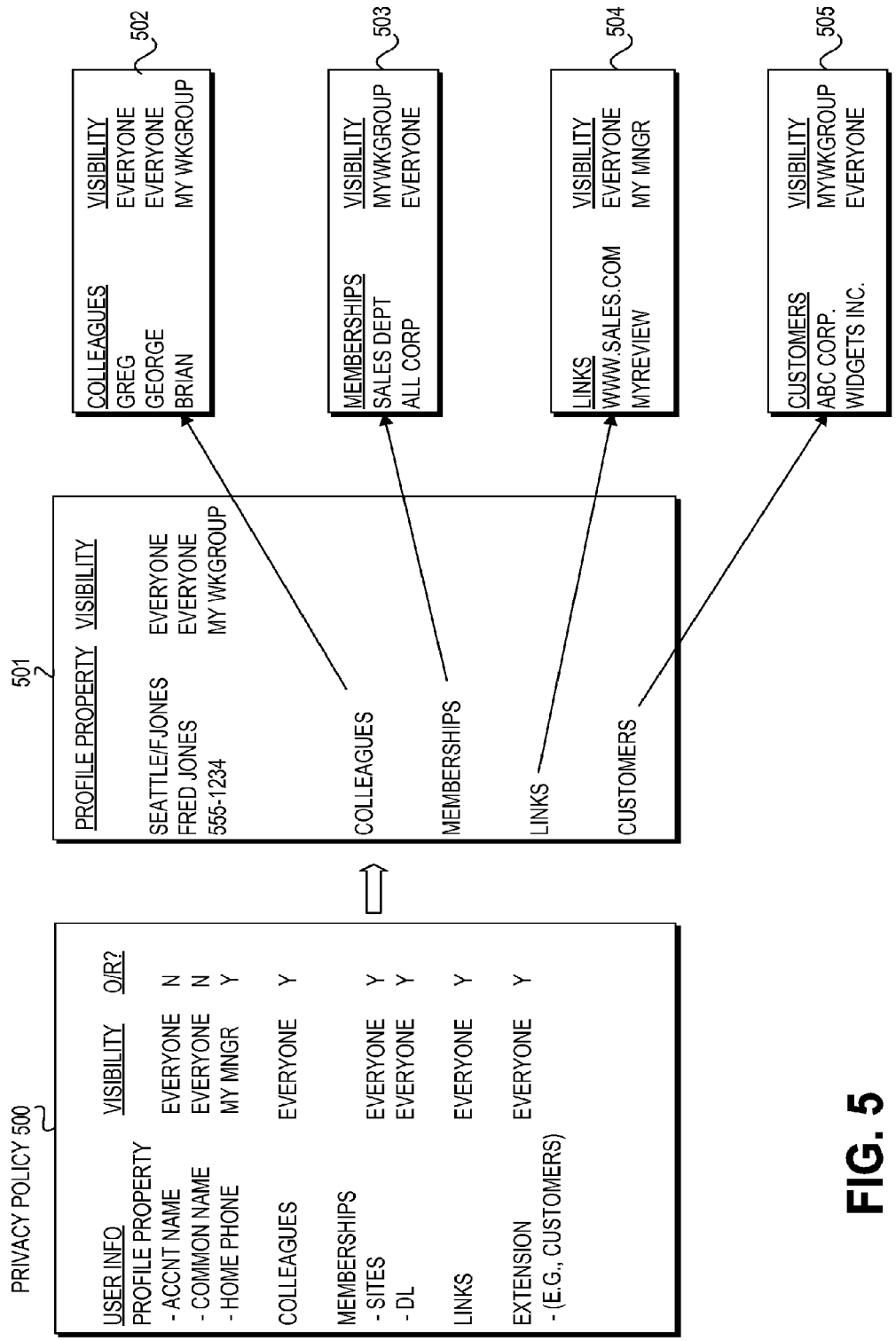
FIG. 5 is a block diagram of a privacy policy and user data in accordance with an embodiment of the invention.

Turning to FIG. 5, an embodiment of applying privacy policy 500 to user data will be discussed. In FIG. 5, user data is shown as five logical units: profile properties 501, colleagues 502, memberships 503, links 504, and customers 505. It will be understood that embodiments of user data are not limited to the logical arrangement as shown in FIG. 5.

User data of FIG. 5 includes an example of extended user information called customers 505. As will be discussed below, embodiments of the invention provide for extension of user information as appropriate for a particular organization.

Privacy policy 500 includes fields for user information, privacy settings ("visibility"), and user override enabled ("O/R?"). Visibility indicates the default visibility setting for the user information. Override indicates whether the privacy setting for the user information may be overridden by the user. Embodiments of modifying the privacy policy are discussed below in conjunction with FIGS. 11 and 12.

Profile properties 501 shows the values for the profile properties for the specific user. Profile properties 501 may also include the visibility for each profile property. This information is needed in cases where the privacy setting may be overridden by the user and the system needs to verify what setting the user has selected. For example, home phone in privacy policy 500 is defaulted to My Manager but with user override permitted. In profile properties 501 the user has changed the privacy setting to My Workgroup.

Profile properties 501 also includes references to colleagues 502, memberships 503, and links 504 where the user may set privacy settings for each item. While not shown, a user may also have privacy settings for each piece of content (such as documents) uploaded to the user's personal site. In FIG. 5, the system administrator has added customers 505. Embodiments herein enable extending user information to data that may be pertinent to a particular organization.

Embodiments herein enable the privacy setting control at a high level of granularity. As shown in FIG. 5, the privacy setting for each piece of user information may be controlled. For example, in colleagues 502, a privacy setting for each individual colleague is provided. Everyone may see that Greg is a colleague of the user, but only those viewers having a relationship of My Workgroup may see that Brian is a colleague of the user. In links 604, privacy settings are provided for each particular link.

Figure 6:
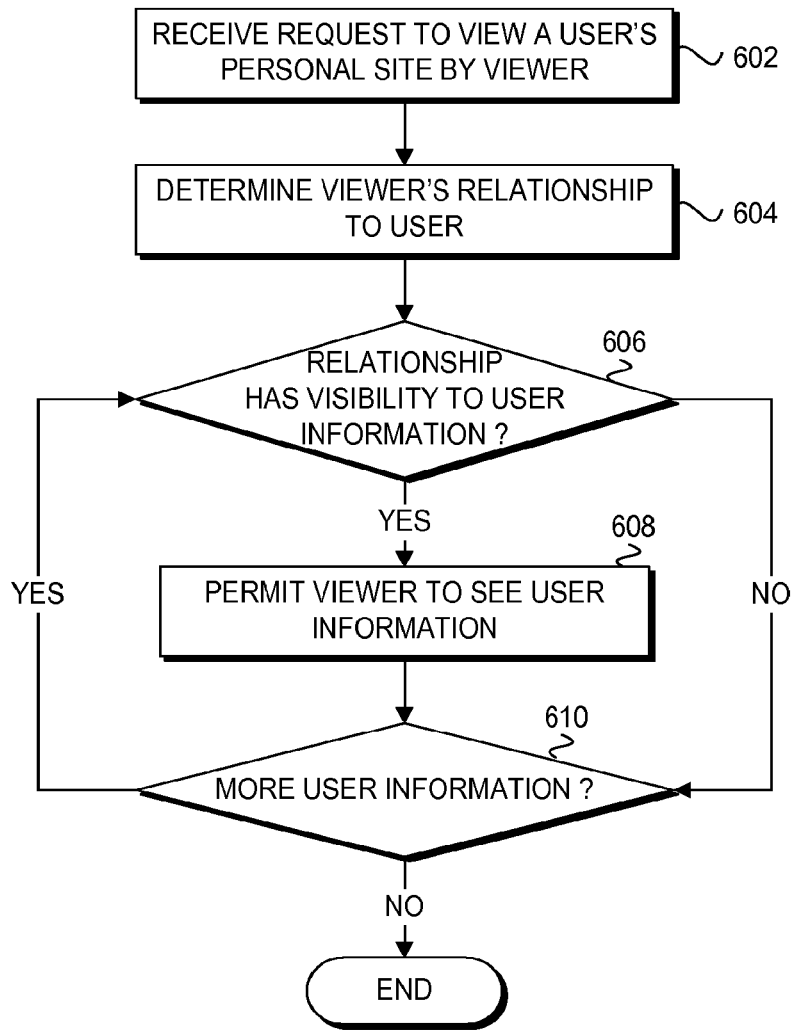
FIG. 6 is a flowchart showing the logic and operations of providing personal site user information to a client in accordance with an embodiment of the invention.

Turning to FIG. 6, a flowchart 600 shows the logic and operations of providing personal site user information to a client in accordance with an embodiment of the invention. In one embodiment, at least a portion of the logic of flowchart 600 is performed by privacy engine 124. Privacy engine 124 applies the organization's privacy policy settings and the user's modified privacy settings. Starting at block 602, a request to view a user's personal site is received from a viewer. Next, in block 604, the relationship of the viewer to the user is determined.

Proceeding to decision block 606, the logic determines what information the relationship has visibility access to based on privacy settings. It will be appreciated that at decision block 606, the visibility determination is made using the relationship and the privacy settings, not the identity of the viewer and the privacy settings.

Referring to FIG. 5, the logic examines the privacy settings in privacy policy 500 for a piece of user information (e.g., home phone), if the user does not have override authority, then the privacy setting in privacy policy 500 is applied to the piece of user information. If the user does have override authority, then the logic applies the privacy setting associated with the piece of user information in the user data (e.g., My Workgroup applied to home phone in user profile properties 501).

If the answer at decision block 606 is no, then the logic proceeds to block 610 (discussed below). If the answer to decision block 606 is yes, then the logic continues to block 608 to permit the viewer to see the user information at the viewer's client. In one embodiment, only user information the relationship permits visibility to is sent to the viewer's client.

Proceeding to decision block 610, the logic determines if there is more user information. If the answer to decision block 610 is no, then flowchart 600 ends. If the answer is yes, then the logic returns to decision block 606 to determine the viewer's visibility rights to additional user information.

Figure 7:
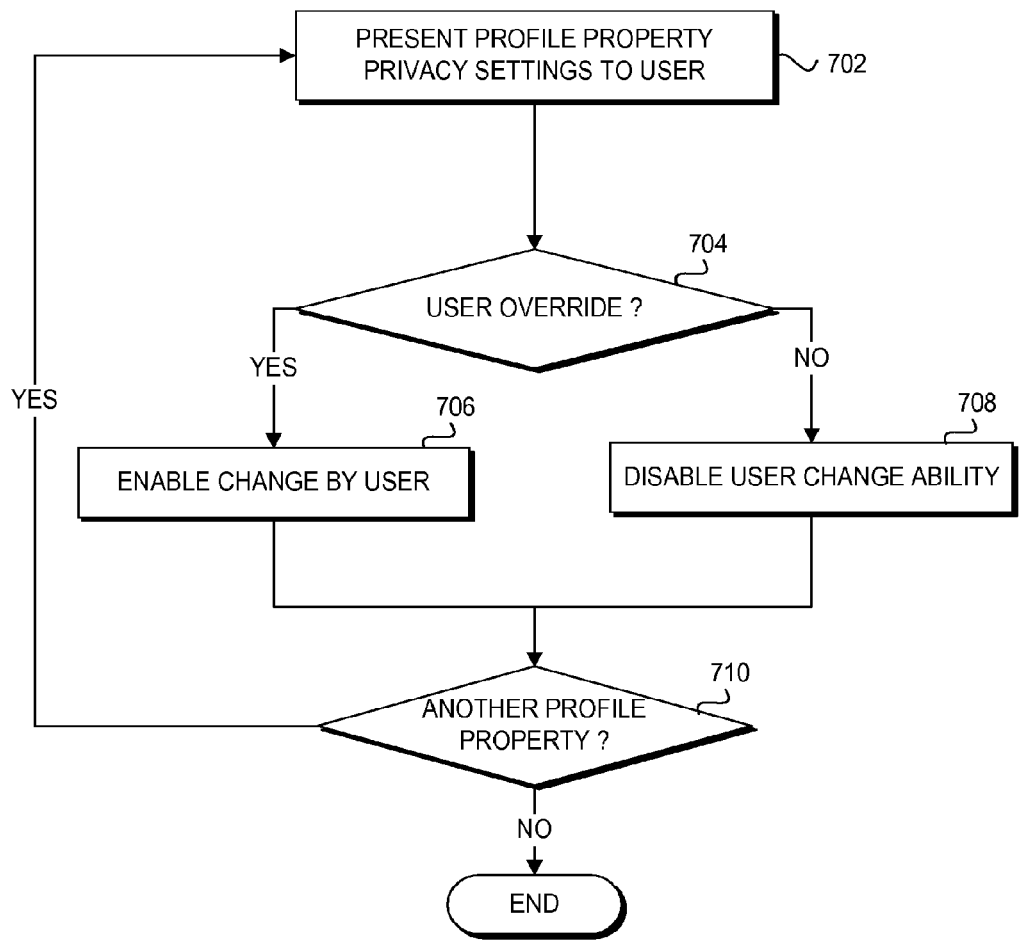
FIG. 7 is a flowchart showing the logic and operations of enabling a user to change their personal site privacy settings in accordance with an embodiment of the invention.

Turning to FIGS. 7 and 8, embodiments of changing privacy settings in response to user input is shown. In FIG. 7, a flowchart 700 shows the logic and operations of modifying privacy settings of a user's profile properties. In one embodiment, the user may request to edit their profile from their personal site by selecting a menu option, clicking a link, or the like. One skilled in the art will appreciate that similar editing logic and pages may be used to edit a user's colleagues, memberships, and links, or other user information.

FIG. 8 shows an embodiment of an edit profile page 800. Section 804 has two columns: profile property and its corresponding privacy setting. If the privacy setting may be modified by the user, then a pull-down menu is available to the user, such as shown at 808. In one embodiment, the user may choose a privacy setting from: My Manager, My Workgroup, My Colleagues, and Everyone. Some privacy settings may not be modified by a user, such as shown at 806. In these cases, the user is not presented with the ability to modify the privacy setting (in FIG. 8, no pull-down menu is available).

In flowchart 700, starting in block 702, a privacy setting of a user's profile property is presented to a user. The logic continues to decision block 704 to determine if a user has authority to override the privacy setting of the profile property. If the answer is yes, the logic proceeds to block 706 to enable the user to change the privacy setting of the profile property. For example, a pull-down menu is provided for the profile property. The logic then proceeds to decision block 710 (discussed below).

If the answer is no, the logic proceeds to block 708 to disable the ability of the user to change the privacy setting. Flowchart 700 then continues to decision block 710 to determine if there is another profile property for the user. If the answer is yes, then the logic returns to block 702. If the answer to decision block 710 is no, then flowchart 700 ends.

Figure 9:
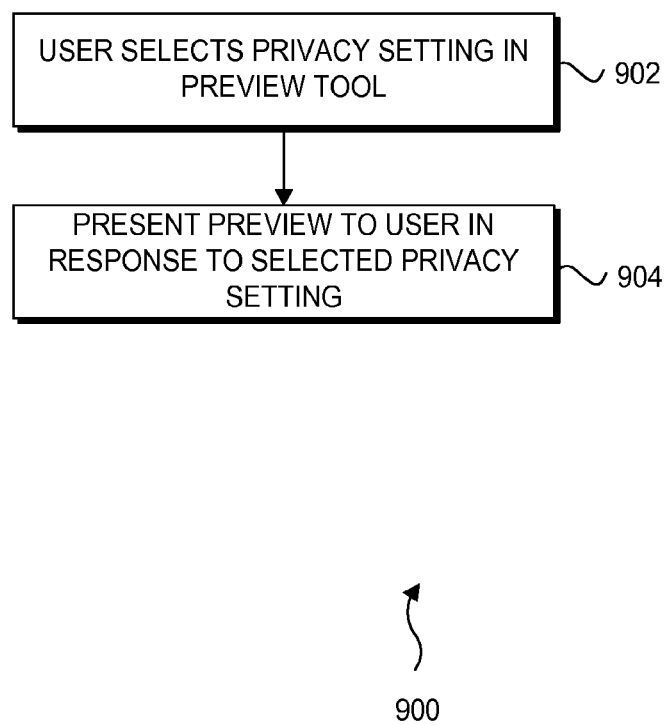
FIG. 9 is a flowchart showing the logic and operations of previewing a user's personal site by the user in accordance with an embodiment of the invention.
Figure 10:
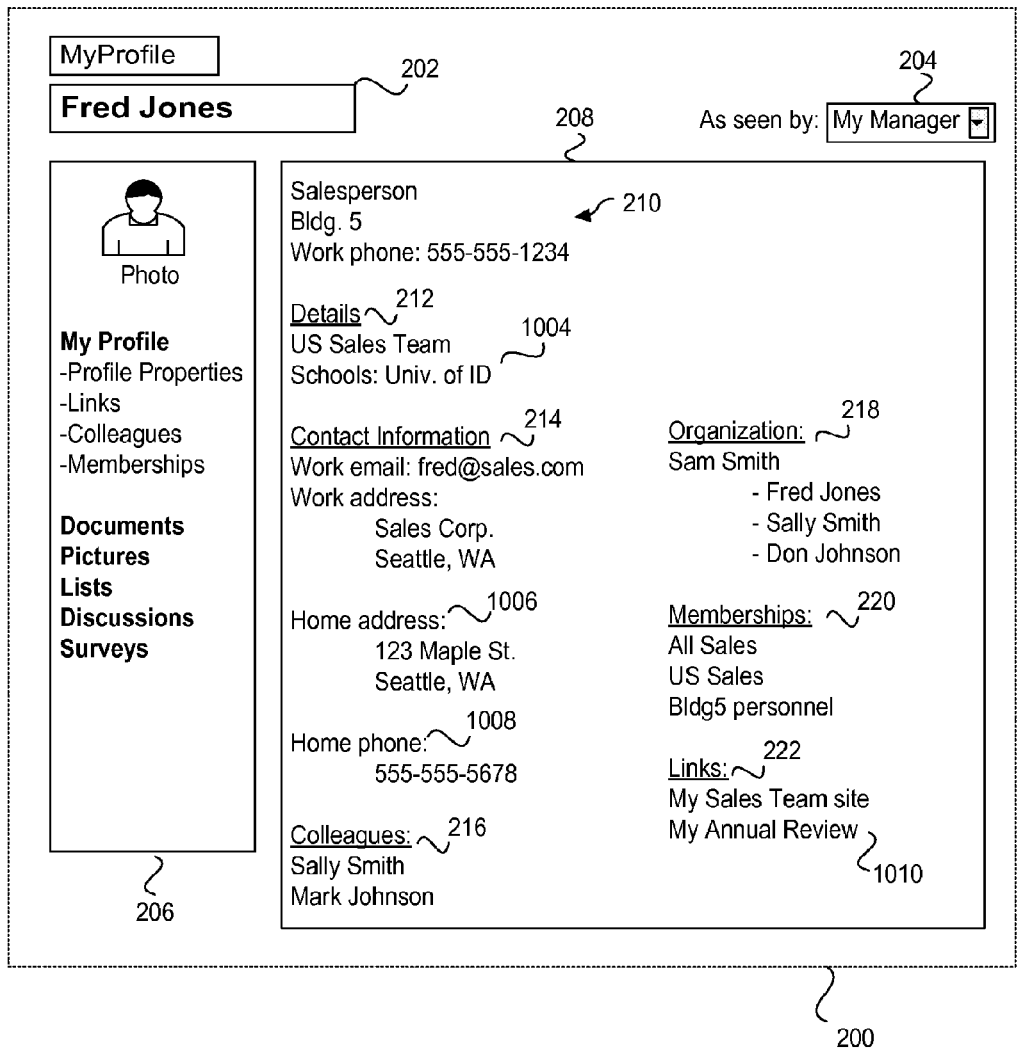
FIG. 10 is a diagram of a personal site in accordance with an embodiment of the invention.

Turning to FIGS. 9 and 10, embodiments of a preview functionality are shown. In FIG. 9, a flowchart 900 shows the logic and operations of a preview tool in accordance with an embodiment of the invention. Starting in a block 902, the user selects the desired privacy setting for preview. In the personal site 200 of FIG. 10, the user may use pull-down menu 204 to select the desired privacy setting. Continuing to block 904 of flowchart 900, a preview of the user's personal site is presented to the user in response to the selected privacy setting in the preview tool. Thus, the user may verify what information will be displayed to a viewer having the selected relationship to the user.

In FIG. 10, personal site 200 is shown as would be seen by My Manager as selected in preview tool 204. Preview tool 204 may be used by Fred Jones to see what his manager will see when viewing Fred Jones' personal site 200.

In FIG. 10, additional information is shown as compared to FIG. 2. In FIG. 2, Everyone is selected in preview tool 204. In FIG. 10, under details 212, schools attended by Fred Jones appear, as shown at 1004. Under contact information 214, home address 1006 and home phone 1008 may be viewed by Fred Jones' manager. Under links 222, a link to document "My Annual Review" 1010 is available to Fred Jones' manager.

Figure 11:
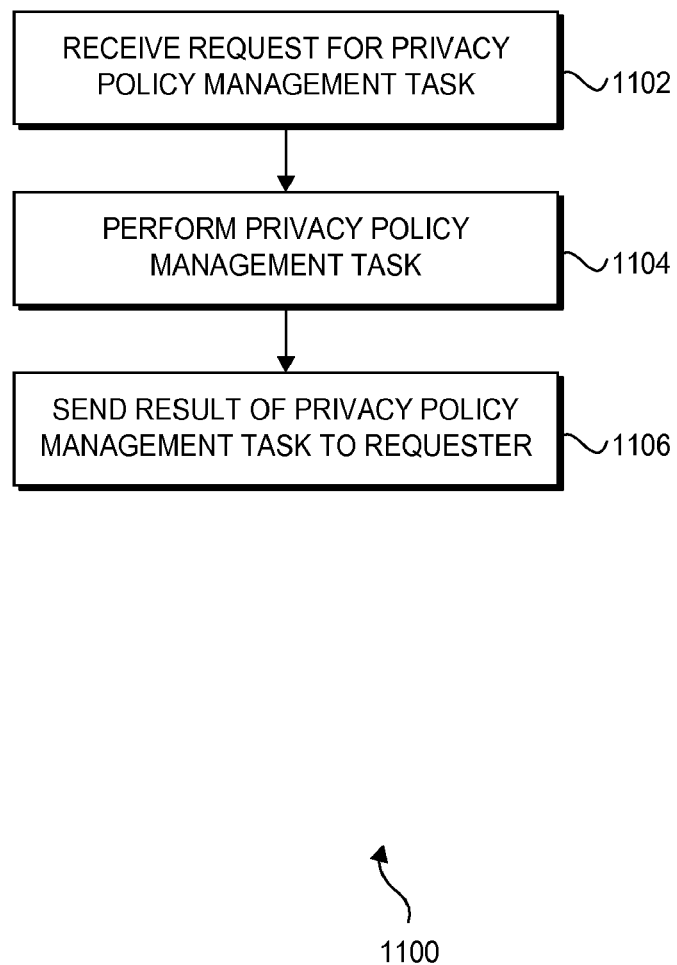
FIG. 11 is a flowchart showing the logic and operations of managing privacy policy in accordance with an embodiment of the invention.

Turning to FIGS. 11 and 12, embodiments of managing privacy policy are shown. In FIG. 11, flowchart 1100 shows an embodiment of the logic and operations of managing privacy policy settings. In one embodiment, management of privacy policy may be performed by a system administrator or other authorized person.

In FIG. 12, a management page 1200 is shown that allows a system administrator to manage privacy policy, such as privacy policy 500, for personal sites. In one embodiment, management page 1200 is accessible using browser 114 at client 113. Column 1210 shows user information (i.e., profile properties, colleagues, memberships, and links), policy column 1212 shows the policy associated with the user information, column 1214 shows the visibility associated with the user information, and column 1216 shows whether the user has the ability to override the default privacy setting. In one embodiment, a system administrator may modify any of the values in any of the columns of FIG. 12. It will be understood that embodiments of privacy policy management page 1200 are not limited to the user information as shown in FIG. 12

In column 1210, Colleagues show sources used to generate a My Colleagues suggested list for a user. In FIG. 12, sources include email traffic, distribution lists (DLs) that contain the user's email address, and the user's instant messaging (IM) traffic.

Memberships show sources used to build MyMemberships for users. In FIG. 12, sources include DL recommendations (DLs that the user is a member of), network site recommendations, and collaborative recommendations. Network site recommendations include other sites of environment 100 that the user is a member of (for example, Microsoft SharePoint® sites). For example, the user's workgroup may have its own site for sharing information with the entire organization. This workgroup site may be included under the user's memberships.

Collaborative memberships include networks sites that the user is not a member of, but by using an algorithm, the network sites are recommended as memberships for the user. In one embodiment, the algorithm analyzes DLs and network sites that people on the user's DLs and network sites are members of that the user is not a member of. The algorithm then recommends at least some of these DLs and network sites as memberships for the user. In one embodiment, the algorithm takes into account the size of the DLs and site memberships when suggesting collaborative memberships. DLs and site memberships with fewer members may be weighted more for inclusion in the collaborative memberships since the user is more likely to know people from smaller groups.

Links show sources for MyLinks on a user's personal site. Link sources include links on the user's personal site, uploaded favorites (such as from a browser), and links to documents on other sites. As described above, the user may be given the ability by a system administrator to control the privacy settings to each item listed under links.

In one embodiment, policy (column 1212) may have one of four values: Mandatory, Opt-In, Opt-out, and Disabled. For Mandatory, the user information may not be left empty. For Opt-In, the user information may be left empty. For Opt-out, the user information value will be populated automatically be the system, but the data may be actively removed by a user. Disabled is used for user information that is not used by the system. In other embodiments, policy (column 1212) may have one of two values: Enabled and Disabled. In this embodiment, for Enabled, a visibility setting for the user information is functional and there are no requirements that the user information value be populated; for Disabled, the user information is not used by the system.

Visibility column 1214 defines the privacy setting for the user information. In the embodiment of FIG. 12, the privacy settings include Only Me, My Manager, My Workgroup, My Colleagues, and Everyone. Override column 1216 indicates which user information has privacy settings that may be modified by a user. In column 1216, a "no" indicates the user cannot override the privacy setting and a "yes" indicates the user has been given the ability to override the privacy setting. The override settings may be modified by a system administrator via page 1200.

Returning to FIG. 11, at block 1102, a requester, such as a system administrator may request a privacy policy management task. In one embodiment, the requester may use a management page such as page 1200 to request the task. Embodiments of privacy policy management tasks include modifying privacy policy, adding new user information, disabling user information, and generating an access control list (described below). Next, at block 1104, the requested task is performed. Continuing to block 1106, the result of performing the task is returned the requester. In one embodiment, the request is received at portal application 122 from a client. Portal application 122 performs the task and returns the results of the task to the client. Returning the results may include showing a requested change in privacy policy on page 1200.

In one embodiment of a privacy policy management task, a system administrator may modify privacy policy settings. When privacy engine 124 is first installed on server 120, privacy settings may be set to pre-determined default privacy settings. A system administrator may modify these default privacy settings at anytime. The system administrator may also modify which privacy settings may be overridden by users.

In one embodiment of a privacy policy management task, a system administrator may add new user information to the system. As described above, user information may be extensible. The privacy setting may be set when the new user information is added and modified at anytime later. The privacy settings model for the newly added user information is the same as for the other user information which eases use for users and system administrators.

In another embodiment of a privacy policy management task, user information may be disabled. In this case, the user information is not rendered on any personal sites. In one embodiment, the user information may be disabled by setting the policy value in column 1212 to Disabled.

In one embodiment of a privacy policy management task, an access control list may be generated from the privacy settings. For example, a user's personal site may include a document library. The privacy setting for a document (e.g., My Workgroup) may be used to generate an access control list for the document. This access control list may be pushed to other systems (e.g., Windows NT Security) and used as a native access control list for the document.

Embodiments of the invention provide privacy settings for personal web sites on an organization's enterprise system. Privacy settings of a user's information may be set on a per-item basis. A preview functionality allows a user to view information on their personal site as seen by others. Embodiments herein provide a system administrator the ability to modify system wide privacy policy and to add new user information as desired.

Figure 13:
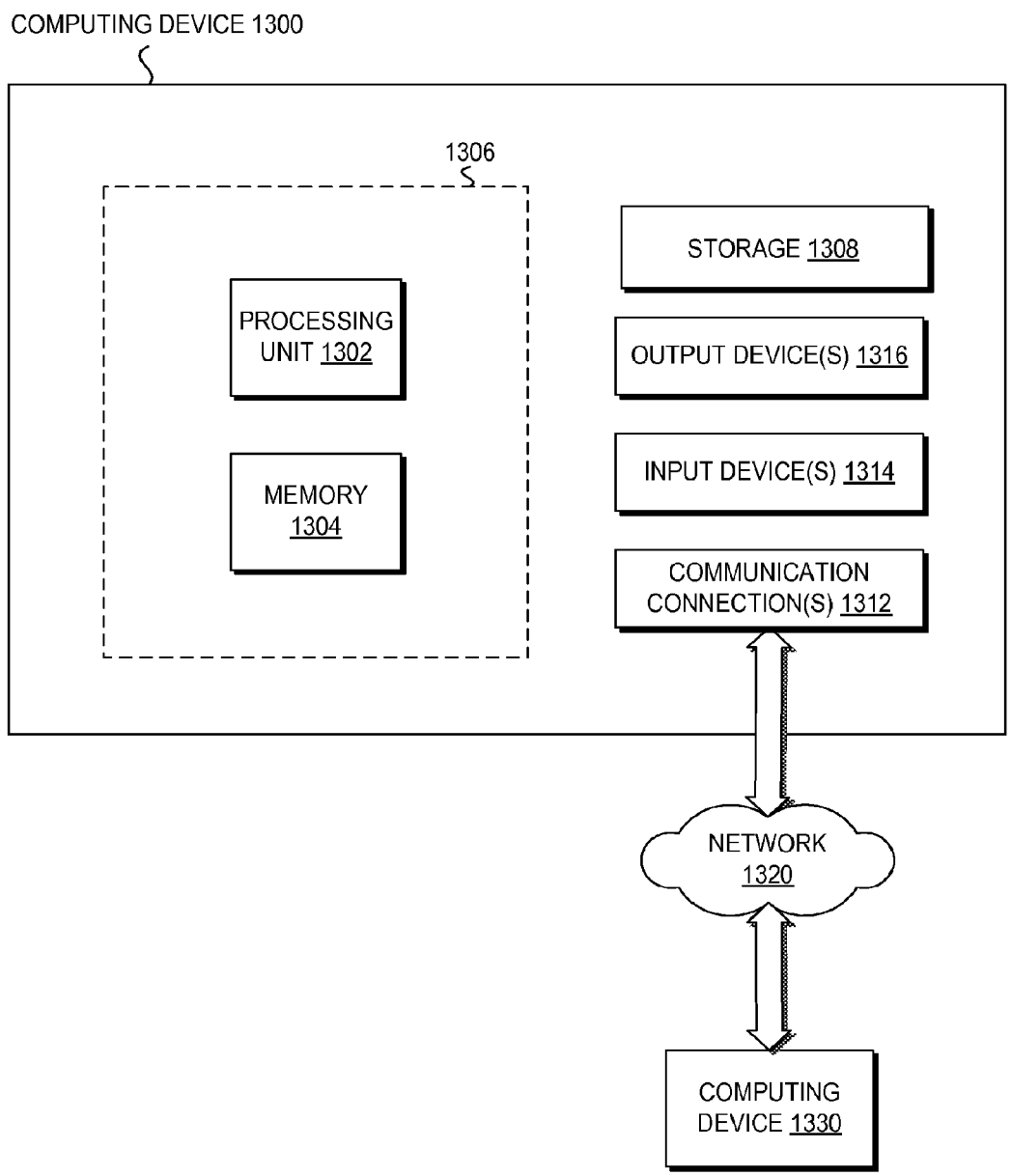
FIG. 13 is a block diagram of an example computing device for implementing embodiments of the invention.

FIG. 13 shows an example of a computing device 1300 for implementing one or more embodiments of the invention. Embodiments of computing device 1300 may be used as clients or servers as shown in FIG. 1. In one configuration, computing device 1300 includes at least one processing unit 1302 and memory 1304. Depending on the exact configuration and type of computing device, memory 1304 may be volatile (such as RAM), non-volatile (such as ROM, flash memory, etc.) or some combination of the two. This configuration is illustrated in FIG. 13 by dashed line 1306.

Additionally, device 1300 may also have additional features and/or functionality. For example, device 1300 may also include additional storage (e.g., removable and/or non-removable) including, but not limited to, magnetic or optical disks or tape. Such additional storage is illustrated in FIG. 13 by storage 1308. In one embodiment, computer readable instructions to implement embodiments of the invention may be stored in storage 1308. Storage 1308 may also store other computer readable instructions to implement an operating system, an application program, and the like.

The term "computer readable media" as used herein includes computer storage media. Computer storage media includes volatile and nonvolatile, removable and non-removable media implemented in any method or technology for storage of information such as computer readable instructions, data structures, program modules, or other data. Memory 1304 and storage 1308 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which can be used to store the desired information and which can be accessed by device 1300. Any such computer storage media may be part of device 1300.

The term "computer readable media" may include communication media. Device 1300 may also include communication connection(s) 1312 that allow device 1300 to communicate with other devices, such as a computing device 1330, through network 1320. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media.

Device 1300 may also have input device(s) 1314 such as keyboard, mouse, pen, voice input device, touch input device, laser range finder, infra-red cameras, video input devices, and/or any other input device. Output device(s)

1316 such as one or more displays, speakers, printers, and/or any other output device may also be included. Input devices 1314 and output devices 1316 may be coupled to computing device 1300 via a wired connection, wireless connection, or any combination thereof. In the following description and claims, the term "coupled" and its derivatives may be used. "Coupled" may mean that two or more elements are in contact (physically, electrically, magnetically, optically, etc.). "Coupled" may also mean two or more elements are not in contact with each other, but still cooperate or interact with each other (for example, communicatively coupled).

Those skilled in the art will realize that storage devices utilized to store computer readable instructions may be distributed across a network. For example, a computing device 1330 accessible via network 1320 may store computer readable instructions to implement one or more embodiments of the invention. Computing device 1300 may access computing device 1330 and download a part or all of the computer readable instructions for execution. Alternatively, computing device 1300 may download pieces of the computer readable instructions, as needed, or some instructions may be executed at computing device 1300 and some at computing device 1330. Those skilled in the art will also realize that all or a portion of the computer readable instructions may be carried out by a dedicated circuit, such as a Digital Signal Processor (DSP), programmable logic array, and the like.

Various operations of embodiments of the present invention are described herein. In one embodiment, one or more of the operations described may constitute computer readable instructions stored on computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment of the invention.

The above description of embodiments of the invention, including what is described in the Abstract, is not intended to be exhaustive or to limit the embodiments to the precise forms disclosed. While specific embodiments and examples of the invention are described herein for illustrative purposes, various equivalent modifications are possible, as those skilled in the relevant art will recognize in light of the above detailed description. The terms used in the following claims should not be construed to limit the invention to the specific embodiments disclosed in the specification. Rather, the following claims are to be construed in accordance with established doctrines of claim interpretation.

What is claimed is:

1. A method, comprising:
    receiving a change to a privacy setting of at least a portion of user information in a profile of a user stored at a server, the change received from a second user different from the user, the second user having privileges to modify the privacy settings associated with the profile such that the privacy setting is not overridden by the user associated with the profile, the privacy setting defining rights of one or more third parties to view an item included in the profile of the user;
    receiving a request at the server, from a requester, to view user information on a user's personal site associated with the user;
    determining a relationship between the requester and the user; and
    providing from the server the item of user information to the requester based on the requester's relationship to the user and the privacy setting.

2. The method of claim 1, wherein the second user comprises an administrator.

3. The method of claim 1, wherein the second user comprises human resources personnel.

4. The method of claim 1, further comprising disabling the ability of the user to change a privacy setting of at least a portion of the user information.

5. The method of claim 1, wherein the user information comprises contact information associated with the user.

6. The method of claim 1, wherein the requester and the user are colleagues.

7. The method of claim 1, wherein the requester and the user are members of a common group.

8. The method of claim 1, further comprising generating a management page useable by the second user to change a privacy setting of the user information in the profile of the user.

9. A system comprising:
    a server computing system including one or more computer readable media having stored computer readable instructions that, when executed by the server computing system, perform operations comprising:
        receiving a change to a privacy setting of at least a portion of user information in a profile of a user stored at the server computing system, the change received from a second user different from the user, the second user having privileges to modify the privacy settings associated with the profile such that the privacy setting is not overridden by the user associated with the profile, the privacy setting defining rights of one or more third parties to view an item included in the profile of the user;
        receiving a request at the server computing system, from a requester, to view user information on a user's personal site associated with the user;
        determining a relationship between the requester and the user; and
        providing from the server the item of user information to the requester based on the requester's relationship to the user and the privacy setting.

10. The system of claim 9, further comprising a computing system communicatively connected to the server computing system and useable by the second user to transmit the change to the privacy setting to the server computing system.

11. The system of claim 9, further comprising a second computing system communicatively connected to the server computing system and useable by the requester to transmit the request to the server computing system.

12. The system of claim 9, wherein the user information comprises contact information associated with the user.

13. The system of claim 9, wherein the requester and the user are colleagues.

14. The system of claim 9, wherein the requester and the user are members of a common group.

15. The system of claim 9, wherein the second user comprises an administrator.

16. The system of claim 9, wherein the second user comprises human resources personnel.

* * * * *